US012674120B2

(12) United States Patent
Matulla et al.

(10) Patent No.: US 12,674,120 B2
(45) Date of Patent: Jul. 7, 2026

(54) SINGLE-DOSE LAUNDRY DETERGENT PACKET

(71) Applicant: Henkel AG & Co. KGaA, Duesseldorf (DE)

(72) Inventors: David Matulla, Hilden (DE); Matthias Sunder, Duesseldorf (DE); Mareile Job, Leverkusen (DE); Rainer Sorg, Kempen (DE); Frank Meier, Duesseldorf (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 426 days.

(21) Appl. No.: 18/299,196

(22) Filed: Apr. 12, 2023

(65) Prior Publication Data

US 2023/0242848 A1 Aug. 3, 2023

Related U.S. Application Data

(63) Continuation of application No. PCT/EP2021/073496, filed on Aug. 25, 2021.

(30) Foreign Application Priority Data

Oct. 16, 2020 (DE) ......................... 102020213065.5

(51) Int. Cl.
*C11D 17/00* (2006.01)
*C11D 17/04* (2006.01)

(52) U.S. Cl.
CPC ......... *C11D 17/044* (2013.01); *C11D 2111/12* (2024.01)

(58) Field of Classification Search
None
See application file for complete search history.

(56) References Cited

U.S. PATENT DOCUMENTS 10,494,767 B2 12/2019 Weisman et al.

FOREIGN PATENT DOCUMENTS

| | | | | | |
|---|---|---|---|---|---|
| DE | 3820631 | A1 | | 1/1989 | |
| DE | 60301823 | T2 | | 5/2006 | |
| EP | 1375377 | B1 | * | 10/2005 | ........... C11D 17/044 |
| EP | 2258820 | A1 | * | 12/2010 | ........... C11D 17/045 |
| JP | H108098 | A | | 1/1998 | |
| JP | 2000169896 | A | | 6/2000 | |
| JP | 2002241798 | A | | 8/2002 | |
| JP | 4619555 | B2 | | 1/2011 | |

OTHER PUBLICATIONS

The Cosmetic, Toiletry, and Fragrance Association, CTFA International Cosmetic Ingredient Dictionary, Fourth Edition, Edited by Joanne M. Nikitakis et al., 1991, 23 pages, The Cosmetic, Toiletry, and Fragrance Association, Washington D.C.
German Patent and Trademark Office, Research Report, DE 10 2020 213 065.5, Jun. 15, 2021, pp. 1-6, Munich, Germany.
European Patent Office, PCT International Search Report, PCT/EP2021/073496, Dec. 6, 2021, pp. 1-14, Rijswijk, Netherlands.

* cited by examiner

*Primary Examiner* — Necholus Ogden, Jr.
(74) *Attorney, Agent, or Firm* — Blank Rome LLP

(57) ABSTRACT

A single-dose laundry detergent packet includes a solid laundry detergent or cleaning agents, and a water-soluble wrapping that completely surrounds the solid laundry detergent or cleaning agent, wherein the exterior of the water-soluble wrapping is at least partially covered with a fiber material. The present invention further relates to a method for the production of a single-dose laundry detergent packet, and washing methods using these single-dose laundry detergent packets.

20 Claims, No Drawings

SINGLE-DOSE LAUNDRY DETERGENT PACKET

FIELD OF THE INVENTION

The present invention relates to a single-dose laundry detergent packet comprising at least one receiving chamber filled with a solid laundry detergent or cleaning agent, which receiving chamber in turn is surrounded by a water-soluble wrapping that is covered at least in part with a fiber material. Furthermore, the application relates to a method for producing said single-dose laundry detergent packet and a washing method for textiles using such a single-dose laundry detergent packet.

BACKGROUND OF THE INVENTION

Continuously changing requirements are imposed on the confection and supply forms of laundry detergent and cleaning agents. In this case, a main focus has been on convenient metering of laundry detergent and cleaning agents by the consumer and the simplification of the work steps necessary for carrying out a washing or cleaning method. A technical solution is provided by pre-portioned laundry detergent or cleaning agents—for example, water-soluble containers having one or more receiving chambers for solid or liquid laundry detergent or cleaning agents.

To produce the water-soluble containers, water-soluble polymers are generally deformed to form receiving chambers, which are subsequently filled with a laundry detergent or cleaning agent and finally closed. The receiving chambers can be produced, for example, from water-soluble polymer films by means of deep-drawing methods. In an alternative embodiment of the method, a water-soluble polymer is deformed by means of injection molding to form a receptacle.

Solid and liquid laundry detergent or cleaning agents are suitable for filling the water-soluble containers. If solid laundry detergent or cleaning agents are used and contain gas-releasing constituents such as bleaching agents, the closed water-soluble container, to avoid excessive pressure formation, has perforations which allow gas exchange between the interior of the receiving chamber and the environment. The design of corresponding perforations requires an additional method step in the production of the water-soluble packaging means or during the production of the filled laundry detergent metering packets.

The filled single-dose laundry detergent packets are generally hygroscopic due to the water-soluble packaging material used for their production. In the context of the production, packaging, storage, and subsequent use by the consumer, the water absorption tendency and water absorption capacity of the packaging means can cause the single-dose packets to adhere to surfaces of machines or packaging means and not be able to be conveyed optimally, or adjacent single-dose packets, e.g., in a common outer packaging, to adhere to one another. To avoid this adhesion tendency of the water-soluble single-dose packets, it is possible to modify the surface properties thereof by applying a powder agent. The powdering of the water-soluble single-dose laundry detergent packets in turn requires an additional method step.

Finally, the chemical nature of conventional water-soluble packaging agents, e.g., polymer films, in combination with their latent hygroscopicity, results in a specific product feel that can be perceived as sticky and detracts from the product experience.

Due to portioning in a water-soluble packaging material, the fragrances added to the laundry detergent or cleaning agent are used only to a very limited extent or not at all in single-dose laundry detergent packets, unlike in conventional solid detergent powders. In response to this situation, laundry detergent products are marketed whose outer cardboard packaging is provided, for example, with fragrance-containing adhesive agents and conveys to the consumer an impression of the fragrance of the laundry detergent or cleaning agent contained therein.

BRIEF DESCRIPTION OF THE INVENTION

Against the background of the prior art described above, it is the object of the application to provide water-soluble, single-dose laundry detergent packets that can be produced by means of simplified methods, have high product and storage stability, can be prepared in a simple manner using minimal amounts of additional packaging material, such as stand-up pouches or cardboard, and excite the consumer with an attractive olfactory, visual, and/or tactile experience.

DETAILED DESCRIPTION OF THE INVENTION

A single-dose laundry detergent packet, comprising the following, is suitable for achieving these objects:

a) laundry detergent or cleaning agents b) a water-soluble wrapping that completely surrounds the laundry detergent or cleaning agent, wherein the exterior of the water-soluble wrapping is at least in part covered with a fiber material.

The term, "single-dose laundry detergent packet," describes a supply form in which a measured portion of a laundry detergent or cleaning agent is present. Single-dose laundry detergent packets consequently refer both to supply forms for textile laundry and to supply forms for cleaning hard surfaces such as ceramics, glass, metal, or tiles.

The term, "single-dose laundry detergent packet," describes a supply form in which a measured portion of a laundry detergent or cleaning agent is present. Single-dose laundry detergent packets consequently refer both to supply forms for textiles and to supply forms for cleaning hard surfaces such as ceramics, glass, metal, or tiles.

The single-dose laundry detergent packet is preferably in the form of a bag. The volume thereof is preferably 4 to 70 mL, preferably 6 to 50 mL, and in particular 8 to 25 mL.

The bags can be in the form of sachets (sealed-edge bags) or tubular bag packaging. In the case of packaging as a sachet, said sachet preferably has two water-soluble textile fabrics that are connected to a bag by means of a circumferential sealing seam, the interior of which bag contains the solid laundry detergent or cleaning agent. The two water-soluble textile fabrics preferably have an identical shape. This shape can be of geometric basic shapes such as circles, oval, triangles, squares, rectangles, pentagon, hexagons, heptagons, octagons, or other polygons. Alternatively, this shape can be designed in the form of a figure—for example, as an organic shape from the plant or animal world. Preferably, at least one of the two water-soluble textile fabrics of the sachet is at least in part covered with a fiber material, and preferably a water-soluble fiber material. The sealing seams of preferred sachets exclusively have rounded profiles. Surprisingly, it has been shown that, during storage and transport, the solid laundry detergent or cleaning agent accumulates in the corners of non-rounded sealing seam profiles, thereby weakening the wrapping material and/or the seam in this region, and thus reducing the storage and transport stability of the sachets.

In an alternative embodiment, the detergent portions have a formed receiving chamber (deep-drawing bag). The receiving chambers can have any technically feasible shape. Spherical dome-shaped, cylindrical, or cubical chambers are particularly preferred. Preferred receiving chambers have at least one edge and one corner; receiving chambers having two, three, four, five, six, seven, eight, nine, ten, eleven, twelve, thirteen, fourteen, fifteen, sixteen, seventeen, eighteen, nineteen, twenty or more edges or two, three, four, five, six, seven, eight, nine, ten, eleven, twelve, thirteen, fourteen, fifteen, sixteen, seventeen, eighteen, nineteen, twenty or more corners are also realizable and preferred according to the invention. Further receiving chambers that can be realized and are preferred in alternative embodiments of the means according to the invention have a dome-shaped structure. The side walls of the receiving chambers are preferably planar. Spatially opposite side walls can be arranged to be both parallel and non-parallel to one another. The base surface of the receiving chambers can be convex, concave, or planar, wherein, in view of the later filling of the intermediate space(s) located between the receiving chambers, planar base surfaces are preferred. The base surface itself can be configured as a circle, but can also have corners. Base surfaces having one corner (drop shape), two, three, four, five, six, seven, eight, nine, ten, eleven, twelve, thirteen, fourteen, fifteen, sixteen, seventeen, eighteen, nineteen, twenty or more corners are preferred in the context of the present application. The transition of the base surface to the side walls or the transition of the side walls into one another is configured in a rounded shape in preferred embodiments of this application. The receiving chambers accordingly have no pointed or sharp edges, but, rather, rounded edges.

The single-dose laundry detergent packet comprises a laundry detergent or cleaning agent as a first essential component. The laundry detergent or cleaning agent can be present as a liquid or solid.

In a preferred embodiment, the laundry detergent or cleaning agent is present as a liquid. The liquid is a composition that is flowable under standard conditions (20° C., 1,013 mbar).

In the context of the present application, powders and/or granule materials and/or extrudates and/or compactates and/or cast bodies are preferably considered to be solids, irrespective of whether they are pure substances or substance mixtures. Suitable solid laundry detergent or cleaning agents are granule materials, extrudates, and compactates. The solids mentioned can be present in an amorphous and/or crystalline and/or partially crystalline form. In the context of the present invention, preferred solids have a water content (for example, determinable as a loss upon drying or according to Karl Fischer) of below 10 wt %, and preferably below 5 wt %.

Powder is a general designation for a form of division of solid substances and/or substance mixtures that is obtained by means of comminution, i.e., triturating or grinding in a mortar (pulverizing), grinding in mills, or as a result of atomization or freeze-drying.

Particularly fine division is often referred to as atomization or micronization; the corresponding powders are referred to as micropowders. Preferred powders have a uniform (homogeneous) mixture of the solid, finely-divided constituents and, in the case of substance mixtures, tend not to separate into individual constituents of these mixtures. Powders particularly preferred in the context of the present application therefore have a particle size distribution in which at least 80 wt %, preferably at least 60 wt %, particularly preferably at least 95 wt %, and in particular at least 99 wt % of the powder, in each case relative to the total weight thereof, deviates from the mean particle size of said powder to a maximum extent of 80%, preferably to a maximum extent of 60%, and in particular to a maximum extent of 40%.

According to the grain size, a rough division of the powders into coarse, fine, and ultrafine powders is customary; pulverulent bulk materials are classified more precisely by their bulk density and by sieve analysis. In principle, powders of any particle size can be used, but preferred powders have average particle sizes of 40 to 500 μm, preferably 60 to 400 μm, and in particular 100 to 300 μm. Methods for determining the average particle size are usually based upon the aforementioned sieve analysis and are described in detail in the prior art.

The undesired caking of the powders can be countered using flow aids or powdering agents. In a preferred embodiment, the powders produced in the method according to the invention therefore contain flow aids or powdering agents, preferably in weight fractions of 0.1 to 4 wt %, particularly preferably 0.2 to 3 wt %, and in particular 0.3 to 2 wt %, in each case relative to the total weight of the powder. Preferred flow aids or powdering agents are—preferably in a finely-ground form—silicates and/or silicon oxide and/or urea.

As particulate mixtures, powders can be agglomerated using a range of techniques. Each method known in the prior art for agglomerating particulate mixtures is suitable in principle for converting the solids enclosed in the containers produced according to the invention into larger aggregates. In the context of the present invention, agglomerates used as solid(s) are—in addition to granule materials—compactates and extrudates.

Granule materials refer to accumulations of granule particles. A granule particle (granule) is an asymmetrical aggregate of powder particles. Granulation methods are widely described in the prior art. Granule materials can be produced by means of moist granulation, dry granulation, or compaction, and by means of melt-solidification granulation.

The most commonly used granulation technique is moist granulation, because this technique is subject to the fewest restrictions and leads the most reliably to granules having favorable properties. Moist granulation is effected by moistening the powder mixtures with solvents and/or solvent mixtures and/solutions of binders and/or solutions of adhesives, and is preferably carried out in mixers, fluidized beds, or spray towers, wherein said mixers may be equipped, for example, with stirring and kneading tools. The granulation agents used can also be foams. However, it is also possible to use combinations of fluidized bed(s) and mixer(s), or combinations of different mixers, for the granulation. Depending upon the starting material and upon the desired product properties, the granulation is effected under the action of low to high shear forces.

When the granulation is effected in a spray tower, the starting substances used may, for example, be melts (melt-solidification) or—preferably aqueous—slurries (spray-drying) of solid substances that are sprayed in defined droplet size at the top of a tower, solidify, or dry in free fall, and occur as a granule at the bottom of the tower. The melt-solidification is generally suitable particularly for shaping low-melting substances that are stable in the region of the melt temperature (for example, urea, ammonium nitrate, and various formulations such as enzyme concentrates, medicaments, etc.); the corresponding granules are also referred to as prills. Spray-drying is used particularly for the production of laundry detergents or laundry detergent constituents.

Further agglomeration techniques are those of extruder or perforated roll granulation, in which, optionally, powder mixtures admixed with granulating liquid are plastically deformed during pressing by perforated disks (extrusion) or on perforated rolls. The products of extruder granulation are also referred to as extrudates.

Compaction can be done, for example, by means of dry granulation techniques such as tableting or roll compaction. Compaction in tablet presses allows single- or multiphase tablets or briquettes to be produced. The multiphase tablets include not only the multilayer or sandwich tablets, but also, for example, the coated tablets and the inlay tablets (bull's-eye tablets). Just like the flakes obtained in compacting rolls, the briquettes may subsequently be comminuted after the compaction by counter-running toothed rolls, or be passed through sieves.

In the context of the present application, castings refer to solid substance particles that are produced by solidification and/or crystallization from melts or solutions. The solidification and/or crystallization is effected preferably in prefabricated dies. The castings removed from the dies after solidification may subsequently, depending upon the size of the die and intended use of the casting, be used in their original size or, optionally, after comminution, as solids.

The solid laundry detergent or cleaning agent is preferably at least in part colored. A colored laundry detergent or cleaning agent allows an attractive visual configuration of the single-dose laundry detergent packet—in particular, in combination with a transparent wrapping. Furthermore, the use of colored components in the solid laundry detergent or cleaning agent allows—in particular, in combination with a transparent and/or white wrapping—simplified detection of insufficiently closed, single-dose laundry detergent packets in the region of the maturation and packaging downstream of the actual production.

A second essential component of the single-dose laundry detergent packet is the water-soluble wrapping. In the preferred single-dose laundry detergent packet, the water-soluble wrapping consists of a water-soluble polymer to an extent of at least 50 wt %, preferably to an extent of at least 60 wt %, particularly preferably to an extent of 60 to 95 wt %, and in particular to an extent of 65 to 95 wt %. A preferred water-soluble polymer is selected from the group of polyvinyl alcohols and copolymers thereof, and preferably from the group of polyvinyl alcohols.

The water-soluble wrapping of the single-dose laundry detergent packet is preferably formed completely from a water-soluble film.

In a technically and economically particularly advantageous, preferred embodiment, the single-dose laundry detergent packet has a water-soluble wrapping that comprises a water-soluble polymer film and a water-soluble fiber material. It is preferred if the preferably water-soluble fiber material covers at least 10%, preferably 15 and 80%, particularly preferably 25 to 60%, and in particular 30 to 45% of the surface of the single-dose laundry detergent packet.

The fiber material, which at least in part covers the water-soluble wrapping of the single-dose laundry detergent packet, can be water-insoluble or water-soluble. Furthermore, the fiber material can be based upon natural or synthetic polymers.

In a first embodiment, the fiber material is based upon water-insoluble natural polymers.

Exemplary preferred fibers originate from the groups of plant fibers—preferably:

- seed fibers—in particular, cotton fiber and poplar fluff;
- bast fibers—in particular, bamboo fiber, stinging nettle, hemp fiber, flax fiber;
- leaf fiber—in particular, sisal fiber;
- fruit fiber—in particular, coconut fiber.

Further water-insoluble fibers originate from the group of animal fibers—for example, from the group of silk, woolens, or cashmere.

Particularly preferred fiber material is selected from the group of chemically industrially produced fibers—in particular:

- fibers based upon natural polymers such as casein fibers, polylactic acid fibers, or alginate fibers;
- fibers based upon synthetic polymers—in particular, polyvinyl alcohol.

Due to their residue-free dissolution in a laundry detergent liquor, water-soluble fiber materials are particularly preferred.

In one embodiment, the fiber material is in the form of individual fibers. The at least partial application of individual fibers on the exterior of the water-soluble wrapping makes it possible to design said exterior in a variety of ways. For example, it is possible to produce covering patterns randomly, to configure the cover geometrically or figuratively in a very wide variety of ways, or to provide covers that are characterized by profiles—for example, the thickness or type of cover.

In many cases, however, the at least partial coverage of the exterior of the water-soluble wrapping with a fiber material in the form of a nonwoven is technically simpler.

Nonwoven materials are structures made of fibers that are joined together to form a fiber layer. The term, "nonwoven," has become an established term for this in the English language. Nonwovens are preferably flexible and bendable. Films or papers are not counted among nonwovens.

Preferred nonwovens are based upon water-soluble polymer fibers, and in particular upon water-soluble fibers based upon polyvinyl alcohol and polyvinyl alcohol copolymers.

The fiber length of the water-soluble polymer fibers is preferably in the range of 1 to 40 mm, and particularly preferably of 2 to 20 mm. The thickness of the fibers is preferably 0.1 to 1,000 μm, and preferably 0.5 to 400 μm. The density of the nonwoven is preferably over 0.15 g/cm$^3$, preferably over 0.2 g/cm$^3$, and in particular in the range of 0.2 to 0.8 g/cm$^3$.

The nonwovens can be produced, for example, by means of mechanical, aerodynamic, or hydrodynamic methods of the prior art. The fibers of the nonwoven can be solidified mechanically, e.g., by means of frictional engagement or a form fit; chemically, e.g., by using binding or solvents; or thermally, by using thermoplastic additives.

In a preferred variant of the single-dose laundry detergent packets, the water-soluble nonwovens are needle-punched nonwovens. In corresponding nonwovens, the entanglement, and thus the compaction and solidification of the fibers by means of needling, e.g., by means of suitable needle boards or needle bars, is achieved.

Preferred in particular are nonwovens, and preferably needle-punched nonwovens, from the group of random orientation nonwovens. In these nonwovens, the fibers have any desired direction and are distributed relatively uniformly in all directions of the nonwoven. Corresponding nonwovens are distinguished not only by a particular appearance and feel, but also improve the mechanical stability of the solid laundry detergent or cleaning agents comprised by the single-dose laundry detergent packet during transport and storage due to the compressibility thereof—for example, in the case of mechanical vibration of a container containing said single-dose laundry detergent packet.

With regard to the appearance, feel, and mechanical properties of the single-dose laundry detergent packet, it has proven advantageous for the water-soluble nonwoven, and in particular the layer of nonwoven, to have a weight per unit area of 40 to 200 g/m$^2$, preferably of 60 to 180 g/m$^2$, and in particular of 80 to 160 g/m$^2$.

In a further preferred variant of the single-dose laundry detergent packet, the water-soluble nonwovens are fabric nonwovens. In these nonwoven fabrics, the fibers are connected by means of an integral connection by means of additives. These binders allow the adhesive connection of the fibers to one another.

Due to their properties, water-soluble nonwovens from the group of the cross-layered nonwovens are particularly preferred, in addition to the random orientation nonwovens. Said nonwovens are produced, for example, by depositing the fibers on a deposit belt with a longitudinal orientation of the fibers relative to the overall nonwoven, wherein the fibers are preferably oriented in two directions. Cross-layered nonwovens also differ visually and haptically from the water-soluble films usually used for producing single-dose laundry detergent packets, but are also better suited than the layer of non-woven fabrics for printing.

With regard to the pressure-related properties of the single-dose laundry detergent packet, it has proven advantageous if the water-soluble nonwoven, and in particular the cross-layered nonwoven, has a weight per unit area of 30 to 80 g/m$^2$, preferably of 33 to 70 g/m$^2$, and in particular of 36 to 70 g/m$^2$.

Like the water-soluble polymer films, the water-soluble nonwovens are also preferably based upon a water-soluble polymer and, due to their availability, in particular upon polyvinyl alcohol and polyvinyl alcohol copolymers, and particularly preferably upon polyvinyl alcohols. The single-dose laundry detergent packet according to one of the preceding points, wherein the water-soluble nonwoven consists of polyvinyl alcohol or polyvinyl alcohol copolymers, and in particular polyvinyl alcohols, to an extent of at least 50 wt %, preferably to an extent of at least 70 wt %, particularly preferably to an extent of at least 90 wt %, and in particular to an extent of at least 98 wt %.

In addition to the preferably polymeric, water-soluble basic structure, the nonwovens may comprise further ingredients. These include, for example, plasticizers, process aids, or washing and cleaning ingredients. If washing or cleaning ingredients are added, these can be incorporated between the fibers of the nonwoven, where they are fixed, for example, by means of adhesive bonding. However, the washing or cleaning ingredients are preferably an integral component of the fibers of the nonwoven and are embedded in the preferably polymeric, water-soluble matrix of the fibers. In a preferred embodiment, the water-soluble nonwoven contains more than 2 wt %, preferably more than 4 wt %, particularly preferably more than 8 wt %, in particular 8 to 60 wt %, preferably 12 to 50 wt %, and in particular 24 to 40 wt % washing or cleaning ingredient.

Washing and cleaning ingredients from the group of surfactants, polymers, and fragrances are particularly suitable for incorporation into the nonwoven. The incorporation of fragrances has an effect that is directly perceptible to the consumer, which is why single-dose laundry detergent packets are preferred in which the water-soluble nonwoven comprises at least one washing or cleaning ingredient from the group of fragrances.

In addition to the aforementioned washing or cleaning ingredients, the water-soluble nonwovens, and in particular the fibers of the water-soluble nonwovens, can contain further active substances relevant to the product action. The group of these active substances includes, for example, dyes. By adding dyes to the fibers of the water-soluble nonwovens, the optics of the single-dose laundry detergent packet can be changed. At the same time, directly or indirectly color-based product communication can be made possible by means of the coloring.

Directly color-based product communication is made possible, for example, by means of signal colors that indicate to the consumer a specific product effect. Such direct product communication is helpful, for example, in packs that comprise several single-dose laundry detergent packets having different effects, e.g., single-dose laundry detergent packets for textile cleaning, in combination with single-dose laundry detergent packets for textile care, and each of these effects is assigned a specific color.

Indirectly color-based product combination describes, for example, product combination by means of an imprint on the water-soluble wrapping of the single-dose laundry detergent packet, which is particularly conspicuous or easily readable due to the color of the water-soluble wrapping surrounding the imprint. In this way, the variation of the basic color of the water-soluble wrapping allows an expansion of the selection of printing inks available for printing the water-soluble wrapping.

Due to their optical properties and their simpler production, preferred fiber materials, and in particular water-soluble fiber materials, are white, i.e., not colored. The white color of the fiber material is particularly suitable for printing. A further feature of the nonwoven that is relevant for printing and its perception is, as already stated above, its special surface property, which differs from that of a conventional water-soluble film. Preferred single-dose laundry detergent packets are consequently characterized in that the fiber material, and in particular the water-soluble fiber material, is printed.

Particularly in combination with a white or a printed white nonwoven, the use of transparent water-soluble films as a constituent of the water-soluble wrapping has proven advantageous. Single-dose laundry detergent packets whose water-soluble wrapping comprises a water-soluble film, wherein said water-soluble film is transparent, are accordingly preferred. Of course, it is also possible to print said water-soluble film. Preference is therefore further given to single-dose laundry detergent packets whose water-soluble wrapping comprises a water-soluble film, wherein the water-soluble wrapping is printed.

In an alternative embodiment, the fiber material is colored. The use of colored fiber material, e.g., colored fibers or colored nonwovens, expands the possibilities for the visual design of the laundry detergent metering packet. Particularly in combination with a transparent film as a wrapping means of the laundry detergent metering packet, a large number of visual configurations can be realized that are beyond the scope of production by means of conventional prior art methods. Examples are deep-drawn containers that, in the region of the deep-drawn part of the wrapping, have high-contrast colored surfaces, symbols, or characters that are usually inaccessible due to the plastic deformation inherent to the deep-drawing method of the water-soluble polymer films used to produce the deep-drawn container.

The fiber material is preferably adhesively bonded to the water-soluble wrapping. Conventional adhesives, for example, but also solvents such as water, are suitable for bonding the two components. Alternatively, the adhesive bond can be realized by the action of heat. It is particularly preferred in this context to add a thermoplastic adhesive to the material of the water-soluble wrapping and/or to the fiber material, which thermoplastic adhesive promotes the adhesive bond between the water-soluble wrapping and the fiber material after the action of temperature. In a particularly preferred embodiment, the solvent or glue or thermoplastic adhesive, and subsequently the fiber material are, firstly, applied to the surface of the water-soluble wrapping to produce an adhesive bond to the fiber material, whereupon a heating or drying step optionally follows.

The solid laundry detergent or cleaning agents described above in relation to their physical properties and the methods used for their production can, like the water-soluble nonwovens, contain washing or cleaning ingredients, wherein washing or cleaning ingredients from the group of builders, surfactants, washing polymers, enzymes, bleaching agents, and fragrances are particularly preferred.

A group of washing or cleaning ingredients, for which packaging by means of the single-dose laundry detergent packets according to the invention offers particular advantages, are bleaching agents, and in particular oxygen bleaching agents. Corresponding single-dose laundry detergent packets in which the solid laundry detergent or cleaning agent comprises at least one washing or cleaning ingredient from the group of bleaching agents, and preferably oxygen bleaching agents, are therefore preferred.

Bleaching agents are in particular understood to mean compounds that supply hydrogen peroxide in an aqueous medium. Among the compounds used as bleaching agents that supply $H_2O_2$ in water, sodium percarbonate, sodium perborate tetrahydrate, and sodium perborate monohydrate are of particular importance. Further bleaches that can be used are, for example, peroxopyrophosphates, citrate perhydrates, and $H_2O_2$-supplying peracidic salts or peracids such as persulfates or persulfuric acid. Also useful is urea peroxohydrate percarbamide, which can be described by the formula $H_2N—CO—NH_2$ $H_2O_2$. Particularly when the agents are used for cleaning hard surfaces, e.g., for automatic dishwashing, the single-dose laundry detergent packets can, if desired, also contain bleaching agents from the group of organic bleaching agents, although their use is in principle also possible in agents for textile laundry. Typical organic bleaching agents are diacyl peroxides, such as, for example, dibenzoyl peroxide. Further typical organic bleaches are peroxy acids, wherein alkyl peroxy acids and arylperoxy acids are particularly mentioned as examples. Preferred representatives are (a) peroxybenzoic acid and ring-substituted derivatives thereof, such as alkyl peroxybenzoic acids, but also peroxy $\alpha$-naphthoic acid and magnesium monoperphthalate, (b) aliphatic or substituted aliphatic peroxy acids, such as peroxylauric acid, peroxystearic acid, $\varepsilon$-phthalimidoperoxycaproic acid (phthalimidoperoxycaproic acid, PAP), o-carboxybenzamidoperoxycaproic acid, N-nonenylamidoperadipic acid, and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassilic acid, diperoxyphthalic acids, 2-decyl diperoxybutane-1,4-diacid, N,N-terephthaloyl-di-(6-aminopercaproic acid). Preferred oxygen bleaching agents are formulated in particulate form, wherein the particles have a coating.

Preferred single-dose laundry detergent packets are characterized in that the solid laundry detergent or cleaning agent comprises at least one washing or cleaning ingredient from the group of oxygen bleaching agents, wherein the weight fraction of the oxygen bleaching agent in the total weight of the solid laundry detergent or cleaning agent is 2 to 60 wt %, and preferably 4 to 40 wt %.

A second group of washing or cleaning ingredients, the packaging of which by means of the single-dose laundry detergent packets according to the invention results in advantages, are fragrances. Preferred single-dose laundry detergent packets are therefore characterized in that the solid laundry detergent or cleaning agent comprises at least one washing or cleaning ingredient from the group of fragrances.

Fragrances in free form or in encapsulated form can be a component of the solid laundry detergent or cleaning agent. The fragrance capsules used are particularly preferably core-shell particles. Corresponding particles known to a person skilled in the art have a fragrance-containing core and a cladding material surrounding said core. In general, high molecular weight compounds of animal or plant origin, e.g., protein compounds (gelatin, albumin, casein), cellulose derivatives (methylcellulose, ethylcellulose, cellulose acetate, cellulose nitrate, carboxymethyl cellulose), and in particular synthetic polymers (e.g., polyamides, polyolefins, polyesters, polyurethanes, epoxy resins, silicone resins, and condensation products of carbonyl and NH group-containing compounds), can be used as cladding material. Specifically, the cladding material can be selected from polyacrylates; polyethylenes; polyamides; polystyrenes; polyisoprenes; polycarbonates; polyesters; polyureas; polyurethanes; polyolefins; polysaccharides; epoxy resins; vinylpolymers; urea cross-linked with formaldehyde or glutaraldehyde; melamine cross-linked with formaldehyde; gelatin-polyphosphate coacervates, optionally cross-linked with glutaraldehyde; gelatin-gum arabic coacervates, silicone resins; polyamines reacted with polyisocyanates; acrylate monomers polymerized by means of free radical polymerization; silk, wool; gelatin; cellulose; proteins; and mixtures and copolymers of the foregoing. Particular preference is given to polyacrylates, polylactic acids, polyethylenes, polyamides, polystyrenes, polyisoprenes, polycarbonates, polyesters, polyureas, polyurethanes, polyolefins, epoxy resins, vinyl polymers, and urea and/or melamine cross-linked with formaldehyde or glutaraldehyde.

In a corresponding embodiment, at least a portion of the fragrance is used in an encapsulated form (fragrance capsules)—in particular, in microcapsules. However, the entire fragrance can also be used in an encapsulated form. The microcapsules can be water-soluble and/or water-insoluble microcapsules. For example, melamine-urea-formaldehyde microcapsules, melamine-formaldehyde microcapsules, urea-formaldehyde microcapsules, or starch microcapsules can be used. “Fragrance precursor” refers to compounds that release the actual fragrance only after chemical conversion/cleavage—typically by the action of light or other ambient conditions, such as pH, temperature, etc. Such compounds are often also referred to as “pro-fragrances.”

Textile-care compounds form a further group of preferred ingredients of the solid laundry detergent or cleaning agent. Preferred single-dose laundry detergent packets contain, relative to their total weight, 0.2 to 30 wt %, preferably 0.5 to 20 wt %, and in particular 1 to 15 wt % textile-care compound.

The group of textile-care compounds preferably comprises in particular:

cationic surfactants;

amphoteric surfactants;
cationic polymers;
fatty substances;
silicones—preferably aminosilicones;
phyllosilicates—preferably bentonite.

It is particularly preferred if the textile-care compound is selected from polysiloxanes, textile-softening clays, cationic polymers, and mixtures thereof.

The use of polysiloxanes and/or cationic polymers as a textile-care compound in the composition is advantageous, because they not only exhibit a softening effect, but also enhance the perfume impression on the laundry.

The use of plasticizing clays as a textile-care compound in the composition is advantageous, because these additionally have a water-softening effect, and, for example, limescale deposits on the laundry can thus be prevented. In order to achieve optimum performance, it may be preferred that the composition comprise a combination of at least two textile-care compounds.

Preferred single-dose laundry detergent packets contain a solid laundry detergent or cleaning agent that contains a textile-care compound from the group of cationic surfactants—in particular, a cationic surfactant from the group of esterquats. The term, "esterquat," as used herein refers to esters of quaternary ammonium polyols—in particular, quaternary ammonium diols and/or triols, such as, for example, triethanol methylammonium or diethanol dimethylammonium—with fatty acids.

The esterquats used in accordance with the invention are ideally liquid to pasty at temperatures around 20° C.

In various embodiments, the composition contains at least one esterquat of the formula $N^+(R_1)_4$-n($(CH_2)_m$—O—C(O)—$R_2)_n$X—, wherein each $R_1$ is independently a substituted or unsubstituted, linear or branched alkyl or alkenyl, and preferably an unsubstituted or hydroxy-substituted alkyl having 1 to 10 carbon atoms; each $R_2$ is a linear or branched, substituted or unsubstituted alkyl or alkenyl or a substituted or unsubstituted (hetero)aryl having up to 26 carbon atoms, and preferably linear unsubstituted $C_{10-26}$ alkyl; n is 1, 2, 3, or 4, and preferably 1, 2, or 3; m is an integer from 1 to 20, and preferably 1 to 4; and X— is any anion.

In various embodiments, in the compounds of formula $N^+(R_1)_4$-n($(CH_2)_m$—O—C(O)—$R_2)_n$X—, C(O)—$R_2)_n$X—, where n is 2 or 3, and preferably 2; and/or m is 1, 2, 3, or 4, and preferably 2, and/or each $R_1$ is independently selected from the group consisting of methyl, ethyl, n-propyl, isopropyl, n-butyl, isobutyl, hydroxymethyl, 2-hydroxyethyl, 2-hydroxypropyl and 3-hydroxypropyl, a first R1 is preferably selected from methyl, ethyl, n-propyl, isopropyl, n-butyl, and isobutyl, and a second R1 is preferably selected from methyl, ethyl, n-propyl, isopropyl, n-butyl, isobutyl, hydroxymethyl, 2-hydroxyethyl, 2-hydroxypropyl, and 3-hydroxypropyl; and/or each R2 is independently selected from linear, unsubstituted $C_{12-20}$ alkyl, and preferably $C_{12-18}$ alkyl; and/or X— is selected from inorganic or organic anions, and in particular fluoride, chloride, bromide, and methosulfate.

In a particularly preferred embodiment, the esterquat used is an esterquat of the formula $N^+(R_1)_4$-n($(CH_2)_m$—O—C(O)—$R_2)_n$X—, where n=2 and m=2, the first $R_1$ is selected from methyl and ethyl, and preferably methyl, the second $R_1$ is selected from methyl and 2-hydroxyethyl, and preferably 2-hydroxyethyl, and each $R_2$ is linear, unsubstituted C12-18 alkyl. Such esterquats are bis(acyloxyethyl)hydroxyethyl methyl ammonium compounds. The counterion is preferably methosulfate. Such esterquats are commercially available, for example, under the trade name, Dehyquart® AU-57 (BASF SE, DE).

Suitable textile-care compounds from the group of amphoteric surfactants include in particular alkylamidopropyl betaines, and preferably linear C8- or C10-alkylamidopropyl betaines, i.e., caprylamidopropyl betaine (N-(3-octanoyl)aminopropyl)-N-carboxymethyl-N,N-dimethyl-1-propanaminium) or capramidopropyl betaine (N-(3-decanoyl)aminopropyl)-N-carboxymethyl-N,N-dimethyl-1-propanaminium), or, very particularly preferably, mixtures of linear C8- and C10-alkylamidopropyl betaines. Such a betaine mixture is commercially available, for example, as Tegoten® B 810 from Evonik Industries.

Single-dose laundry detergent packets can contain a textile-care compound from the group of the cationic polymers as a constituent of the solid laundry detergent or cleaning agent.

Suitable cationic polymers include in particular those described in "CTFA International Cosmetic Ingredient Dictionary," Fourth Edition, J. M. Nikitakis, et al., editors, published by the Cosmetic, Toiletry, and Fragrance Association, 1991, and are summarized under the collective name, "polyquaternium." Some suitable polyquaternium compounds are listed in more detail as follows: POLYQUATERNIUM-1 (CAS number: 68518-54-7), POLYQUATERNIUM-2 (CAS number: 63451-27-4), POLYQUATERNIUM-3, POLYQUATERNIUM-4 (CAS number: 92183-41-0), POLYQUATERNIUM-5 (CAS number: 26006-22-4), POLYQUATERNIUM-6 (CAS number: 26062-79-3), POLYQUATERNIUM-7 (CAS number: 26590-05-6), POLYQUATERNIUM-8, POLYQUATERNIUM-9, POLYQUATERNIUM-11 (CAS number: 53633-54-8), POLYQUATERNIUM-12 (CAS number: 68877-50-9), POLYQUATERNIUM-13 (CAS number: 68877-47-4), POLYQUATERNIUM-14 (CAS number: 27103-90-8), POLYQUATERNIUM-15 (CAS number: 35429-19-7), POLYQUATERNIUM-16 (CAS number: 95144-24-4), POLYQUATERNIUM-17 (CAS number: 90624-75-2), POLYQUATERNIUM-18, POLYQUATERNIUM-19, POLYQUATERNIUM-20, POLYQUATERNIUM-21 (CAS number: 102523-94-4), POLYQUATERNIUM-22 (CAS number: 53694-17-0), POLYQUATERNIUM-24 (CAS number: 107987-23-5), POLYQUATERNIUM-27, POLYQUATERNIUM-28 (CAS number: 131954-48-8), POLYQUATERNIUM-29, POLYQUATERNIUM-30, Polyquaternium-31 (CAS number: 136505-02-7), polyquaternium-32 (CAS number: 35429-19-7), polyquaternium-37 (CAS number: 26161-33-1), polyquaternium-44 (CAS number: 150595-70-5), POLYQUATERNIUM-68 (CAS number: 827346-45-2), Alternatively, preferred single-dose laundry detergent packets as a constituent of the solid laundry detergent or cleaning agent contain a textile-care compound from the group of silicones, and preferably aminosilicones.

A preferably usable polysiloxane has the structural unit a) —$(R_1)_2$Si—O$)_n$—, where $R_1$=C1-C30-alkyl independent of one another, and preferably C1-C4-alkyl, and in particular methyl or ethyl, and n=1 to 5,000, preferably 10 to 2,500, and in particular 100 to 1,500.

If the polysiloxane has only the structural unit a), where $R_1$=methyl, it is a polydimethyl siloxane. Polydimethyl polysiloxanes are known as efficient textile-care compounds. Suitable polydimethyl siloxanes include DC-200 (ex Dow Corning), Baysilone® M 50, Baysilone® M 100, Baysilone® M 350, Baysilone® M 500, Baysilone® M 1000, Baysilone® M 1500, Baysilone® M 2000, or Baysilone® M 5000 (all ex GE Bayer Silicones).

Preferably, the polysiloxane additionally also has the structural unit b) —$(R_1(YNR_2R_3)Si—O)_x$—, where $R_1$=C1-C30-alkyl, preferably C1-C4-alkyl, and in particular methyl or ethyl, Y=optionally substituted, linear or branched C1-C20-alkylene, and preferably —$(CH_2)$m-, where m=1 to 16, preferably 1 to 8, in particular 2 to 4, and especially 3, $R_2$, $R_3$=independently of one another H or optionally substituted, linear or branched C1-C30-alkyl, and preferably C1-C30-alkyl substituted with amino groups, particularly preferably —$(CH_2)_b$—$NH_2$, where b=1 to 10, most preferably b=2, and x=1 to 5,000, preferably 10 to 2,500, and in particular 100 to 1,500.

A particularly preferred polysiloxane has the following structure: $(CH_3)_3Si$—[O—$Si(CH_3)_2]_n$—[O—$Si(CH_3)${$(CH_2)_3$—NH—$(CH_2)_2$—$NH_2$}]x-$OSi(CH_3)_3$, where the sum n+x is a number between 2 and 10,000.

In various preferred embodiments of the invention, the compositions may contain at least one aminosiloxane as silicone oil. This can be selected, for example, from the group comprising amodimethicone/morpholinomethyl silsesquioxane copolymer (CAS no. 1293390-78-9), trideceth-9 PG amodimethicone (CAS no. 943769-53-7), with methylsilsesquioxane hydroxy-terminated dimethyl, methyl(aminoethylaminoisobutyl)siloxane (CAS no. 863918-80-3), and dimethyl, methyl(aminoethylaminoisobutyl)siloxanes (CAS no. 106842-44-8). Particularly preferred is amodimethicone/morpholinomethyl silsesquioxane copolymer (CAS no. 1293390-789), which is commercially available as Belsil® ADM 8301 E (Wacker Chemie).

Aminosiloxanes are additionally used to improve the water absorption capacity, the rewettability of the treated textiles, and to facilitate ironing the treated textiles. They additionally improve the rinsing out behavior of the agent according to the invention by virtue of their foam-inhibiting properties. If an agent is mentioned in the present application, this is understood to mean the softener.

Further preferred single-dose laundry detergent packets are characterized in that the solid laundry detergent or cleaning agent comprises a textile-care compound from the group of phyllosilicates, and preferably bentonites.

A suitable textile-softening phyllosilicate is, for example, a smectite clay. Preferred smectite clays include beidellite clays, hectorite clays, laponite clays, montmorillonite clays, nontronite clays, saponite clays, sauconite clays, and mixtures thereof. Montmorillonite clays are the preferred softening clays. Bentonites contain mainly montmorillonite and can be used as a preferred source for the textile-softening clay. The bentonites can be used as powders or crystals.

Suitable bentonites are sold, for example, under the names, Landrosil®, from Süd-Chemie or under the name, Detercal, from Laviosa. It is preferred that the textile-care composition contain a powdered bentonite as a textile-care compound.

In an embodiment that is preferred due to its ready accessibility, the single-dose laundry detergent packet has only one receiving chamber. Of course, it is also possible to provide single-dose laundry detergent packets having two, three, or four receiving chambers. If the single-dose laundry detergent packet comprises more than one receiving chamber, these receiving chambers are preferably filled with solid laundry detergent or cleaning agents that are different from one another.

Due to its reduced adhesion and bonding tendency, it is possible to package a single-dose laundry detergent packet together with further single-dose packets in larger containers, without further outer packaging. It is preferred that the single-dose laundry detergent packet be packaged in an outer packaging together with at least one further single-dose laundry detergent packet, and preferably with at least ten further single-dose laundry detergent packets—preferably loose in bulk—in direct contact with one another.

A further subject matter of the application is a method for producing a single-dose laundry detergent packet described above, comprising the steps of:

i) providing a water-soluble film;

ii) deforming the water-soluble film to form a receiving chamber;

iii) filling the receiving chamber with a solid laundry detergent or cleaning agent;

iv) closing the filled receiving chamber and applying a fiber material to the exterior of the closed receiving chamber.

In step i) of the production process, a water-soluble polymer film is preferably used.

Before filling with the solid laundry detergent or cleaning agent, the water-soluble film is deformed in step ii) of the method, forming a receiving chamber. This deformation is preferably carried out by deep-drawing the water-soluble film—for example, under the action of negative pressure. Alternatively or in addition, it is possible to effect the deformation in step ii) by the action of a punch.

After being filled in step iii), the filled receiving chamber is closed in step iv). In one embodiment of the method, the receiving chamber is closed in step iv) by means of a water-soluble closure means, and preferably a water-soluble polymer film that is covered on its surface at least in part with a water-soluble fiber material.

In an alternative embodiment of the method, the receiving chamber is closed in step iv) by means of a water-soluble closure means, and preferably a water-soluble polymer film, and the resulting closed, single-dose laundry detergent packet is subsequently covered at least in part with a fiber material.

The single-dose laundry detergent packet can be covered with the fiber material in the region of the exterior of the receiving chamber with a fiber material or in the region of the exterior of the closure means.

A third subject matter is a method for textile care or textile cleaning in which one of the aforementioned single-dose laundry detergent packets is introduced into the dispensing drawer or the washing drum of a textile washing machine.

The machine textile washing method is preferably carried out at temperatures of 20° C. to 90° C., and preferably 30° C. to 45° C.

Preferred embodiments of the production method and the method for textile care or textile cleaning have, mutatis mutandis, the features cited with respect to the single-dose laundry detergent packet, to which reference is made at this point in order to avoid repetitions.

In summary, this application provides, inter alia, the following subject matter:

1. A single-dose laundry detergent packet comprising a) laundry detergent or cleaning agents b) a water-soluble wrapping that completely surrounds the solid laundry detergent or cleaning agent, wherein the exterior of the water-soluble wrapping is at least in part covered with a fiber material.

2. The single-dose laundry detergent packet according to point 1, wherein the single-dose packet is in the form of a bag.

3. The single-dose laundry detergent packet according to one of the preceding points, wherein the single-dose packet is in the form of a sachet.
4. The single-dose laundry detergent packet according to point 3, wherein the sachet comprises two water-soluble textile fabrics that are connected to a bag by means of a circumferential sealing seam, the interior of which bag contains the solid laundry detergent or cleaning agent.
5. The single-dose laundry detergent packet according to point 4, wherein at least one of the two water-soluble textile fabrics of the sachet is covered with a fiber material, and preferably a water-soluble fiber material.
6. The single-dose laundry detergent packet according to point 4, wherein the circumferential sealing seam has a rounded profile.
7. The single-dose laundry detergent packet according to one of the preceding points, wherein the single-dose packet has a cubical, cylindrical, or spherical-dome-shaped receiving chamber.
8. The single-dose laundry detergent packet according to one of the preceding points, wherein the single-dose laundry detergent packet has a volume of 4 to 70 mL, preferably 6 to 50 mL, and in particular 8 to 25 mL.
9. The single-dose laundry detergent packet according to one of the preceding points, wherein the laundry detergent or cleaning agent is present in the form of a liquid.
10. The single-dose laundry detergent packet according to one of the preceding points, wherein the laundry detergent or cleaning agent is present in the form of a powder, granulate, extrudate, compactate, or cast body, and preferably in the form of a granulate, extrudate, or compactate.
11. The single-dose laundry detergent packet according to one of the preceding points, wherein the water-soluble wrapping consists of a water-soluble polymer to an extent of at least 50 wt %, preferably to an extent of at least 60 wt %, particularly preferably to an extent of 60% to 95 wt %, and in particular to an extent of 65% to 95 wt %.
12. The single-dose laundry detergent packet according to one of the preceding points, wherein the water-soluble wrapping comprises a water-soluble polymer from the group of polyvinyl alcohols and copolymers thereof, and preferably from the group of polyvinyl alcohols.
13. The single-dose laundry detergent packet according to one of the preceding points, wherein the water-soluble wrapping consists entirely of a water-soluble film.
14. The single-dose laundry detergent packet according to one of the preceding points, wherein the fiber material is water-soluble.
15. The single-dose laundry detergent packet according to one of the preceding points, wherein the fiber material is present in the form of individual fibers.
16. The single-dose laundry detergent packet according to one of the preceding points, wherein the fiber material is present in the form of a nonwoven.
17. The single-dose laundry detergent packet according to point 16, wherein the water-soluble nonwoven is selected from the group of the needle-punched nonwovens.
18. The single-dose laundry detergent packet according to one of points 16 or 17, wherein the fiber material is present in the form of a nonwoven, and the water-soluble nonwoven is selected from the group of random orientation nonwovens.
19. The single-dose laundry detergent packet according to one of points 16 to 18, wherein the water-soluble nonwoven fabric has a weight per unit area of 40 to 200 $g/m^2$, preferably of 60 to 180 $g/m^2$, and in particular of 80 to 160 $g/m^2$.
20. The single-dose laundry detergent packet according to point 16, wherein the water-soluble nonwoven is selected from the group of integral nonwovens.
21. The single-dose laundry detergent packet according to one of points 16 or 20, wherein the water-soluble nonwoven is selected from the group of cross-layered nonwovens.
22. The single-dose laundry detergent packet according to one of points 16, 20, or 21, wherein the water-soluble nonwoven has a weight per unit area of 30 to 80 $g/m^2$, preferably of 33 to 70 $g/m^2$, and in particular of 36 to 70 $g/m^2$.
23. The single-dose laundry detergent packet according to one of the preceding points, wherein the fiber material consists of polyvinyl alcohol to an extent of at least 50 wt %, preferably to an extent of at least 70 wt %, particularly preferably to an extent of at least 90 wt %, and in particular to an extent of at least 98 wt %.
24. The single-dose laundry detergent packet according to one of the preceding points, wherein the fiber material contains, relative to its total weight, more than 2 wt %, preferably more than 4 wt %, particularly preferably more than 8 wt %, in particular 8 to 60 wt %, preferably 12 to 50 wt %, and in particular 24 to 40 wt % washing or cleaning ingredient.
25. The single-dose laundry detergent packet according to one of the preceding points, wherein the fiber material is white.
26. The single-dose laundry detergent packet according to one of the preceding points, wherein the fiber material is colored.
27. The single-dose laundry detergent packet according to one of the preceding points, wherein the water-soluble wrapping and the fiber material are adhesively bonded to one another.
28. The single-dose laundry detergent packet according to one of the preceding points, wherein the water-soluble wrapping comprises a deep-drawn, water-soluble polymer film.
29. The single-dose laundry detergent packet according to one of the preceding points, wherein fiber material covers at least 10%, preferably 15 and 80%, particularly preferably 25 to 60%, and in particular 30 to 45% of the surface of the single-dose laundry detergent packet.
30. The single-dose laundry detergent packet according to one of the preceding points, wherein the fiber material is printed.
31. The single-dose laundry detergent packet according to one of the preceding points, wherein the water-soluble wrapping comprises a water-soluble film, and the water-soluble film is transparent.
32. The single-dose laundry detergent packet according to one of the preceding points, wherein the water-soluble wrapping comprises a water-soluble film, and the water-soluble wrapping is printed.
33. The single-dose laundry detergent packet according to one of the preceding points, wherein the solid laundry detergent or cleaning agent is at least in part colored.
34. The single-dose laundry detergent packet according to one of the preceding points, wherein the solid laundry detergent or cleaning agent comprises at least one washing or cleaning ingredient from the group of builders, surfactants, washing polymers, enzymes, bleaching agents, and fragrances.

35. The single-dose laundry detergent packet according to one of the preceding points, wherein the solid laundry detergent or cleaning agent comprises at least one washing or cleaning ingredient from the group of bleaching agents, and preferably oxygen bleaching agents.

36. The single-dose laundry detergent packet according to one of the preceding points, wherein the solid laundry detergent or cleaning agent comprises at least one washing or cleaning ingredient from the group of fragrances.

37. The single-dose laundry detergent packet according to one of the preceding points, wherein the solid laundry detergent or cleaning agent comprises, relative to its total weight, 0.2 to 30 wt %, preferably 0.5 to 20 wt %, and in particular 1 to 15 wt % textile-care compound.

38. The single-dose laundry detergent packet according to one of the preceding points, wherein the solid laundry detergent or cleaning agent comprises a textile-care compound from the group of cationic surfactants.

39. The single-dose laundry detergent packet according to one of the preceding points, wherein the solid laundry detergent or cleaning agent comprises a textile-care compound from the group of amphoteric surfactants.

40. The single-dose laundry detergent packet according to one of the preceding points, wherein the solid laundry detergent or cleaning agent comprises a textile-care compound from the group of cationic polymers.

41. The single-dose laundry detergent packet according to one of the preceding points, wherein the solid laundry detergent or cleaning agent comprises a textile-care compound from the group of fatty substances.

42. The single-dose laundry detergent packet according to one of the preceding points, wherein the solid laundry detergent or cleaning agent comprises a textile-care compound from the group of phyllosilicates, and preferably bentonites.

43. The single-dose laundry detergent packet according to one of the preceding points, wherein the solid laundry detergent or cleaning agent comprises a textile-care compound from the group of silicones, and preferably aminosilicones.

44. The single-dose laundry detergent packet according to one of the preceding points, wherein the solid laundry detergent or cleaning agent contains less than 10 wt %, and preferably less than 5 wt % water.

45. The single-dose laundry detergent packet according to one of the preceding points, wherein the single-dose laundry detergent packet has a receiving chamber.

46. The single-dose laundry detergent packet according to one of the preceding points, wherein the single-dose laundry detergent packet has two, three, or four receiving chambers that are filled with solid laundry detergent or cleaning agents that are different from one another.

47. The single-dose laundry detergent packet according to one of the preceding points, wherein the single-dose laundry detergent packet is packaged in an outer packaging together with at least one further single-dose laundry detergent packet—preferably loose in bulk—in direct contact with one another.

48. A method for producing a single-dose laundry detergent packet according to one of points 1 to 47, comprising the steps of:

i) providing a water-soluble film;

ii) deforming the water-soluble film to form a receiving chamber;

iii) filling the receiving chamber with a solid laundry detergent or cleaning agent;

iv) closing the filled receiving chamber and applying a fiber material to the exterior of the closed receiving chamber.

49. The method according to point 48, wherein a water-soluble polymer film is used as the water-soluble film in step i).

50. The method according to one of the preceding points, wherein the water-soluble film is deep-drawn in step ii).

51. The method according to one of the preceding points, wherein the water-soluble film is deformed in step ii) by the action of a punch.

52. The method according to one of the preceding points, wherein the receiving chamber is closed in step iv) by means of a water-soluble closure means, and preferably a water-soluble polymer film that is covered on its surface at least in part with a water-soluble fiber material.

53. The method according to one of the preceding points, wherein the receiving chamber is closed in step iv) by means of a water-soluble closure means—preferably a water-soluble polymer film—and the resulting closed, single-dose laundry detergent packet is subsequently covered at least in part with a fiber material.

54. The method according to point 53, wherein the closed, single-dose laundry detergent packet is covered with a fiber material in the region of the exterior of the receiving chamber.

55. The method according to point 53, wherein the closed, single-dose laundry detergent packet is covered with a fiber material in the region of the exterior of the closure means.

56. A method for textile care or textile cleaning, in which a single-dose laundry detergent packet according to one of points 1 to 47 is introduced into the dosing chamber or the washing drum of a textile washing machine.

The invention claimed is:

1. A single-dose laundry detergent packet comprising:

a laundry detergent or cleaning agent;

a water-soluble wrapping that completely surrounds the laundry detergent or cleaning agent; and individual fibers adhesively bonded over the exterior of the water-soluble wrapping that overlaps with the laundry detergent or cleaning agent using a thermoplastic adhesive, wherein the individual fibers are adhesively bonded over from 30% to 45% of the exterior of the water-soluble wrapping.

2. The single-dose laundry detergent packet of claim 1, wherein the single-dose laundry detergent packet is in the form of a bag.

3. The single-dose laundry detergent packet of claim 1, wherein the individual fibers are water-soluble fibers.

4. The single-dose laundry detergent packet of claim 1, wherein the individual fibers are printed.

5. The single-dose laundry detergent packet of claim 1, wherein the water-soluble wrapping comprises a water-soluble film.

6. A method for textile care or textile cleaning, the method comprising introducing the single-dose laundry detergent packet of claim 1 into a dispensing drawer or a washing drum of a textile washing machine.

7. The single-dose laundry detergent packet of claim 1, wherein at least one of the water-soluble wrapping or the individual fibers comprises the thermoplastic adhesive.

8. The single-dose laundry detergent packet of claim 1, wherein the individual fibers comprise a polyvinyl alcohol.

9. The single-dose laundry detergent packet of claim 1, wherein the individual fibers comprise at least one of a plasticizer, a process aid, a surfactant, a dye, or a fragrance.

10. The single-dose laundry detergent packet of claim 1, wherein the individual fibers are water-insoluble natural fibers.

11. The single-dose laundry detergent packet of claim 1, wherein the individual fibers are adhesively bonded over the exterior of the water-soluble wrapping according to a visual configuration.

12. The single-dose laundry detergent packet of claim 1, wherein the individual fibers are adhesively bonded over the exterior of a deep-drawn part of the water-soluble wrapping.

13. The single-dose laundry detergent packet of claim 1, wherein the water-soluble wrapping comprises a polyvinyl alcohol.

14. The single-dose laundry detergent packet of claim 1, wherein the water-soluble wrapping is transparent.

15. The single-dose laundry detergent packet of claim 1, wherein the fiber length of the individual fibers is from 1 mm to 40 mm.

16. The single-dose laundry detergent packet of claim 1, wherein the fiber thickness of the individual fibers is from 0.5 μm to 400 μm.

17. The single-dose laundry detergent packet of claim 1, wherein the individual fibers are selected from the group consisting of seed fibers, bast fibers, bamboo fiber, leaf fiber, fruit fiber, and any combination thereof.

18. The single-dose laundry detergent packet of claim 1, wherein the individual fibers are selected from the group consisting of silk, wool, cashmere, and any combination thereof.

19. The single-dose laundry detergent packet of claim 1, wherein the individual fibers are selected from the group consisting of casein fibers, polylactic acid fibers, alginate fibers, and any combination thereof.

20. The single-dose laundry detergent packet of claim 11, wherein the visual configuration is a geometric configuration or a figurative configuration.

* * * * *